Dec. 27, 1949      R. HOUWINK      2,492,699

FLEXIBLE BAG FOR TRANSPORTING CARGO ON WATER

Filed June 26, 1947      2 Sheets-Sheet 1

R. Houwink

By Henry C. Parker

Patented Dec. 27, 1949

2,492,699

UNITED STATES PATENT OFFICE 2,492,699

FLEXIBLE BAG FOR TRANSPORTING CARGO ON WATER

Roelof Houwink, Wassenaar, Netherlands, assignor to Rubber-Stichting, Delft (South-Holland), Netherlands Application June 26, 1947, Serial No. 757,124

2 Claims. (Cl. 114—0.5)

The invention relates to the transport of goods by water, e. g. by sea, without storing them in a ship.

According to the invention the goods are towed, e. g. by a tugboat, in an evacuated watertight bag. This method of transport is particularly suitable for beams or trunks.

It is known to transport trunks in rafts for which purpose the trunks are mutually connected by means of clamps, chains and the like. In smooth water, such as occurs in river transport, this method of mutual connection gives good satisfaction. As soon as it is desired, however, to transport such rafts by sea trouble occurs. By the wash of the waves the cargo starts shifting, because of which the original connections which have some play, get loose and the raft eventually gets out of connection.

According to the invention a raft is made by surrounding the beams with a watertight cylindrical covering whereupon air is evacuated wholly or partially out of this covering which is filled with beams. In this manner a vacuum is obtained in the bag; by atmospherical pressure at the outside of the bag the latter collapses about the cargo and the beams are then strongly pressed together so that loosening is impossible.

As a watertight covering preferably rubber, polyvinylchloride, etc. strengthened or not with layers of canvas or the like material, may be used. Also other watertight coverings can be used.

Beside the fact that the beams stay closely together this method of transport has another advantage. As there is a vacuum between the beams the specific gravity of the whole raft will be less than that of the wood only. Consequently the raft will lie less deep in the water owing to which the resistance in towing is decreased. The towing resistance is moreover decreased thereby that not all beams separately are in contact with the water. A further advantage is that the contents of the raft remains dry during transport.

With the aid of such a covering transport by sea of various products is possible. Also, however, in river transport this method can already offer advantages.

The invention is by way of example further elucidated by means of the drawing.

Figure 1:
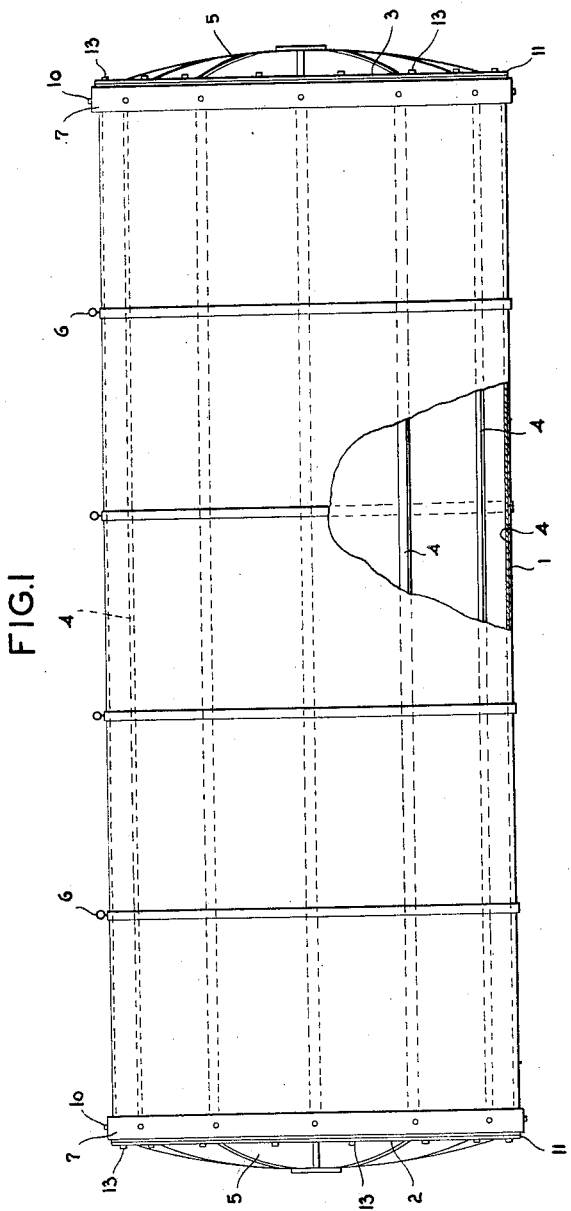
Figure 1 is a side view of a device for the transport according to the invention.
Figure 2:
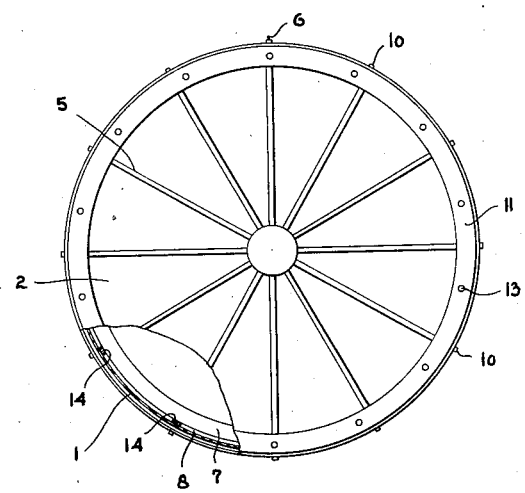
Figure 2 is a front view of Figure 1.
Figure 3:
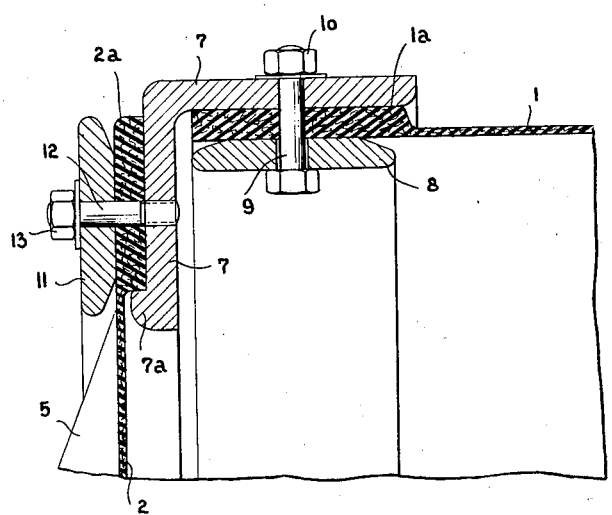
Figure 3 shows a detail of Figure 1 at a larger scale.

The device for the transport according to the invention consists in a rubber bag 1 strengthened with canvas with removable non-collapsible closing lids or heads 2 and 3 at the front and at the back also consisting of rubber strengthened with canvas. This bag 1 and these lids 2 and 3 are provided with stiffening canvas ribs 4 and 5. Eyes 6 are arranged at the back to make hoisting out of the water possible. This bag can be evacuated and the connection between the bag and a lid is further shown in Fig. 3. The thickened part 1a of the bag is clamped between a ringshaped corner piece 7 and an inner ring 8 by means of bolts 9 with nuts 10. Also the thickened rim 2a of the rubber lid 2 is clamped between the part 7a of the ring shaped corner piece 7 and the outer ring 11 by means of studs 12 with nuts 13. Means not shown are of course provided to evacuate the bag 1 after it is filled with cargo.

I claim:

1. A device for the transport of cargoes such as wooden beams and trunks on the surface of the water, which comprises a collapsible cylindrical bag constructed of flexible water-proof material, water-proof heads hermetically closing the ends of said cylindrical bag and adapted to be removed when cargo is introduced or removed from said bag, means for evacuating the bag after it is filled with cargo whereby the bag collapses about the cargo and means for towing the filled and evacuated bag on the surface of the water.

2. The device of claim 1 wherein said cylindrical bag is constructed of rubber strengthened with canvas.

ROELOF HOUWINK.

REFERENCES CITED

The following references are of record in the file of this patent:

UNITED STATES PATENTS

| Number | Name | Date |
|---|---|---|
| 1,312,356 | Reid | Aug. 5, 1919 |
| 2,383,840 | Beuckert | Aug. 28, 1945 |